United States Patent
Lee et al.

(10) Patent No.: US 8,982,804 B2
(45) Date of Patent: Mar. 17, 2015

(54) METHOD AND APPARATUS FOR TRANSMITTING AND RECEIVING UPLINK CONTROL INFORMATION IN WIRELESS COMMUNICATION SYSTEM

(75) Inventors: Hyunwoo Lee, Seoul (KR); Jiwoong Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 1020 days.

(21) Appl. No.: 13/049,827

(22) Filed: Mar. 16, 2011

(65) Prior Publication Data
US 2011/0249634 A1 Oct. 13, 2011

Related U.S. Application Data

(60) Provisional application No. 61/321,884, filed on Apr. 8, 2010.

(30) Foreign Application Priority Data

Feb. 10, 2011 (KR) .......................... 10-2011-0011875

(51) Int. Cl.
*H04W 4/00* (2009.01)
*H04W 72/04* (2009.01)
*H04W 72/12* (2009.01)

(52) U.S. Cl.
CPC ...... *H04W 72/0406* (2013.01); *H04W 72/1268* (2013.01)
USPC ............................ 370/329; 370/336; 370/341

(58) Field of Classification Search
None
See application file for complete search history.

(56) References Cited

U.S. PATENT DOCUMENTS

2009/0219897 A1* 9/2009 Pajukoski et al. ............. 370/336
2010/0260116 A1* 10/2010 Imamura et al. .............. 370/329

* cited by examiner

*Primary Examiner* — John Blanton
*Assistant Examiner* — Tito Pham
(74) *Attorney, Agent, or Firm* — Lee, Hong, Degerman, Kang & Waimey

(57) ABSTRACT

A method and apparatus for transmitting and receiving uplink control information in a wireless communication system are disclosed. A method for receiving uplink control information from a base station in a wireless communication system includes the steps of allocating resources for transmitting uplink control information, transmitting resource allocation information of the resources, and receiving uplink control information from at least one user equipment through the resources. Herein, the resources are multiplexed so that a single PUCCH format can be used by a plurality of user equipments, a plurality of information, or a plurality of random access opportunities by enabling the plurality of user equipments, the plurality of information, or the plurality of random access opportunities to use different constellations each other.

16 Claims, 4 Drawing Sheets

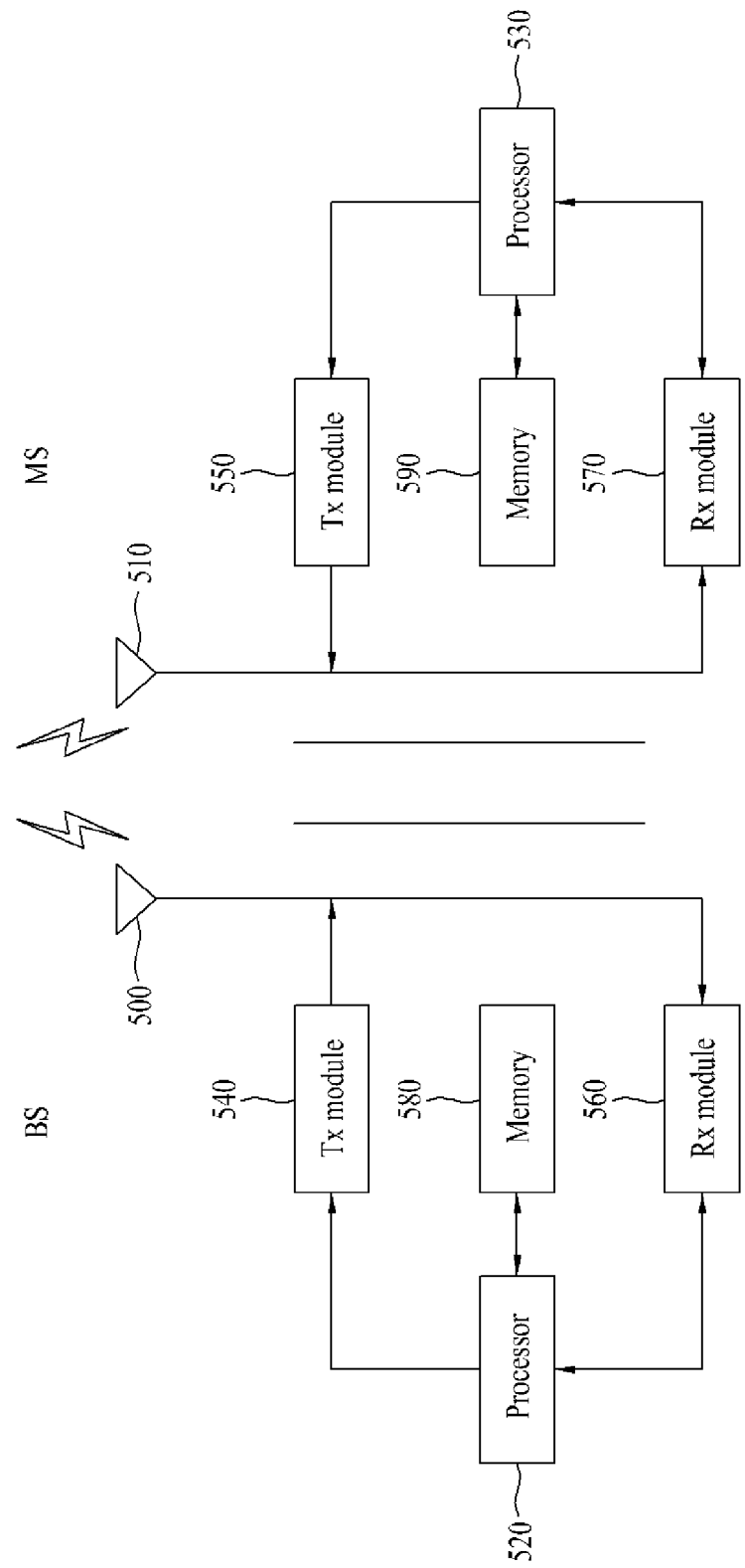

METHOD AND APPARATUS FOR TRANSMITTING AND RECEIVING UPLINK CONTROL INFORMATION IN WIRELESS COMMUNICATION SYSTEM

CROSS-REFERENCE TO RELATED APPLICATIONS

Pursuant to 35 U.S.C. §119, this application claims the benefit of earlier filing date and right of priority to Korean Application No. 10-2011-0011875, filed on Feb. 10, 2011, and also claims the benefit of U.S. Provisional Application Ser. No. 61/321,884, filed on Apr. 8, 2010, the contents of which are incorporated by reference herein in their entirety.

BACKGROUND OF THE INVENTION

1. Field of the Invention

The present invention relates to a wireless communication system and, more particularly, to a method and apparatus for transmitting and receiving uplink control information in a wireless communication system.

2. Discussion of the Related Art

First of all, a frame structure of a wireless communication system will be described in detail with reference to FIG. 1. FIG. 1 illustrates the frame structure of a Long Term Evolution (LTE) system. As shown in FIG. 1, one frame includes 10 subframes, and one subframe includes 2 slots. The time required for transmitting one subframe is referred to as a transmission time interval (hereinafter referred to as "TTI"). For example, one subframe may correspond to 1 ms, and one slot may correspond to 0.5 ms.

One slot includes a plurality of orthogonal frequency division multiplexing (OFDM) symbols. An OFDM symbol may also be referred to as an Orthogonal Frequency Division Multiple Access (OFDMA) symbol or a Single-carrier FDMA (SC-FDMA) symbol or a symbol period.

Depending upon the length of a cyclic prefix (hereinafter referred to as "CP"), a slot includes 7 or 6 OFDM symbols. A normal CP and an extended CP exist in the LTE system. In case of using a normal CP, one slot includes 7 OFDM symbols. And, in case of using an extended CP, one slot includes 6 OFDM symbols. The extended CP is used when a delay spread is large.

A Physical Uplink Control Channel (PUCCH) of the LTE system will now be briefly described. Herein, the LTE system will be described to have a normal cyclic prefix (CP) for simplicity. Also, a general PUCCH mode, which consists of a slot that is configured of 7 SC-FDMA symbols or clustered DFTs OFDM symbols or Nx SC-FDMA symbols and a subframe that includes 2 slots, will be described in detail.

The user equipment (or user terminal) may transmit uplink control information through the PUCCH. The uplink control information may include diverse types of information, such as a Scheduling Request (SR), an Acknowledgement/Non-Acknowledgement (ACK/NACK) signal, a Channel Quality Indicator (CQI), a Precoding Matrix Indicator (PMI), a Rank Indicator (RI), and so on. Depending upon the format, the PUCCH delivers diverse types of control information.

The PUCCH formats 1, 1a, and 1b use the same physical channel structure, and the modulation method of each format corresponds to N/A (present or absent) or On-Off Keying (OOK), Binary Phase Shift Keying (BPSK), Quadrature Phase Shift Keying (QPSK). And, depending upon the presence and absence, the sizes (i.e., 1 bit and 2 bits) of the transmission information of each format is also different from one another.

Depending upon each format, a modulated complex number symbol d(0) is multiplied by a cyclically shifted sequence $r_{u,v}^{(\alpha)}(n)(n=0,1,\ldots,11)$, so as to generate y(n). The block y(n) of the complex number symbol is scrambled by $S(n_s)$, and a block-wise spread is performed on the block y(n) by using an orthogonal sequence $w_{n_{oc}}(m)$ (m=0, 1, 2, 3), thereby creating a signal as shown in Equation 1 below.

$$z(m' \cdot N_{SF}^{PUCCH} \cdot N_{seq}^{PUCCH} + m \cdot N_{seq}^{PUCCH} + n) \qquad \text{[Equation 1]}$$

where, $N_{SF}^{PUCCH} = 4$ for normal PUCCH, $N_{seq}^{PUCCH} = 12, m = 0,$ $1, \ldots, N_{SF}^{PUCCH} - 1, i = 0, 1, \ldots, N_{seq}^{PUCCH} - 1, m' = 0, 1$ The resource index $n_{PUCCH}^{(1)}$ represents a resource for transmitting PUCCH formats 1, 1a, and 1b. Herein, the resource index $n_{PUCCH}^{(1)}$ consists of an orthogonal sequence index $n_{OC}(n_s)$ and a cyclic shift $\alpha(n_s, 1)$. The resource index within 2 resource blocks within the 2 slots of a single subframe is given as $n'(n_s)$.

The generated (or created) sequence has a slot-to-slot hopping sequence within a single resource unit, which is configured of 7 symbols and 12 subcarriers, and is mapped to two SC-FDMA symbols or clustered DFTs symbols or Nx SC-FDMA symbols located at each end of the time domain within a slot (i.e., mapped to a total of 4 symbols). Herein, 3 symbols of the slot are used as a reference signal.

Herein, the PUCCH resource index $n_{PUCCH}^{(1)}$ corresponds to information on a scrambling code and a spread code that are used by each user equipment (or user terminal) in the corresponding channel. Accordingly, the PUCCH resource index $n_{PUCCH}^{(1)}$ is used for differentiating each user equipment. More specifically, after performing an adequate modulation process at an allocated (or assigned) PUCCH physical time and frequency resource, based upon the PUCCH format or objective (e.g., ACK/NACK, SR, etc.), each user equipment may create (or generate) and transmit a signal by using the allocated resource index. The above-described PUCCH resource index, such as $n_{PUCCH}^{(1)}$, $N_{PUCCH}^{(1)}$, $n_{PUCCH,ANRep}^{(1)}$, $n_{PUCCH,SRI}^{(1)}$, and so on, is induced from the respective smallest Control Channel Elements(CCE) index or assigned (or given) by a higher-level (or upper-level) layer.

The PUCCH formats may be used for the following purposes.

PUCCH Format 1 is used for positive SR. Positive SR signifies a case where a scheduling request is made. PUCCH Format 1a is used for a 1-bit HARQ-ACK. And, in case of the FDD, PUCCH Format 1a is used for a 1-bit HARQ-ACK accompanied by a positive SR. PUCCH Format 1b is used for a 2-bit HARQ-ACK. And, PUCCH Format 1b is used for a 2-bit HARQ-ACK accompanied by a positive SR. PUCCH Format 1b is used for HARQ-ACK accompanied by channel selection.

PUCCH Format 2 is used for a CQI/PMI or RI report, when multiplexing with the HARQ-ACK is not performed. Also, when an extended cyclic prefix (CP) is used, PUCCH Format 2 is used for a CQI/PMI or RI report, which is multiplexed with the HARQ-ACK.

PUCCH Format 2a is used for a CQI/PMI or RI report, which is multiplexed with a 1-bit HARQ-ACK. PUCCH Format 2b is used for a CQI/PMI or RI report, which is multiplexed with a 2-bit HARQ-ACK, when a normal cyclic prefix (CP) is used.

The physical time or subframe of a PUCCH assigned (or allocated) to a specific user equipment for ACK/NACK is identical to the physical time or subframe of a PUCCH assigned (or allocated) to a specific user equipment for SR. Herein, only the respective PUCCH resource (code and/or frequency) indexes may be different from one another. In this case, the ACK/NACK may be transmitted through an ACK/NACK resource, which is assigned (or allocated) to perform negative SR. Herein, negative SR refers to a case where a scheduling request is not made (or does not exist). However, in order to perform positive SR, the ACK/NACK is transmitted to assigned (or allocated) SR PUCCH. More specifically, a modulation process is performed on the ACK/NACK, and, then, the modulated value is transmitted by using the assigned (or allocated) SR PUCCH resource.

The above-described PUCCH Formats 1, 1a, and 1b are designed for the transmission uplink control information in a single user equipment (UE). Therefore, the PUCCH Formats 1, 1a, and 1b have the disadvantages of degrading resource efficiency and increasing latency.

SUMMARY OF THE INVENTION

Accordingly, the present invention is directed to a method and apparatus for transmitting and receiving uplink control information in a wireless communication system that substantially obviate one or more problems due to limitations and disadvantages of the related art.

As described above, being designed for the transmission of uplink control information of a user equipment, the related art PUCCH format is disadvantageous in that the resource efficiency is degraded and that the latency is increased.

Accordingly, another object of the present invention is to provide a method and apparatus for transmitting and receiving uplink control information that can enhance resource efficiency and reduce latency.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a method for receiving uplink control information from a base station in a wireless communication system, the method for receiving the uplink control information includes the steps of allocating resources for transmitting uplink control information, transmitting resource allocation information of the resources, and receiving uplink control information from at least one user equipment through the resources. Herein, the resources are multiplexed so that a single PUCCH format can be used by a plurality of user equipments, a plurality of information, or a plurality of random access opportunities by enabling the plurality of user equipments, the plurality of information, or the plurality of random access opportunities to use different constellations each other.

Also, the resource allocation information may include an index of the resource and information on a constellation.

The information on the constellation may correspond to a designation of the constellation.

Herein, the information on the constellation may correspond to a phase rotation value of the constellation.

A scheduling request (SR) and an Acknowledgement/Non-Acknowledgement (ACK/NACK) respective to two user equipments may be multiplexed and transmitted through the resources.

Herein, when the ACK/NACK is equal to or larger than 2 bits, the ACK/NACK may be bundled and transmitted.

In another aspect of the present invention, in a method for transmitting uplink control information from a user equipment of a wireless communication system, the method for transmitting the uplink control information includes the steps of receiving resource allocation information of resources for transmitting uplink control information from a base station, and transmitting uplink control information to the base station through the resources. Herein, the resources are multiplexed so that a single PUCCH format can be used by a plurality of user equipments, a plurality of information, or a plurality of random access opportunities by enabling the plurality of user equipments, the plurality of information, or the plurality of random access opportunities to use different constellations each other.

In another aspect of the present invention, in a base station in a wireless communication system, the base station includes a processor configured to allocate resources for transmitting uplink control information, a transmission module configured to transmit the resources of resource allocation information, and a reception module configured to receive uplink control information from at least one user equipment through the resources. Herein, the resources are multiplexed so that a single PUCCH format can be used by a plurality of user equipments, a plurality of information, or a plurality of random access opportunities by enabling the plurality of user equipments, the plurality of information, or the plurality of random access opportunities to use different constellations each other.

In a further aspect of the present invention, in a user equipment of a wireless communication system, the user equipment includes a reception module configured to receive resource allocation information of resources for transmitting uplink control information from a base station, and a transmission module configured to transmit uplink control information to the base station through the resources. Herein, the resources are multiplexed so that a single PUCCH format can be used by a plurality of user equipments, a plurality of information, or a plurality of random access opportunities by enabling the plurality of user equipments, the plurality of information, or the plurality of random access opportunities to use different constellations each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 illustrates a structure of a mobile terminal and a base station that can be realized according to the embodiments of the present invention.

DETAILED DESCRIPTION OF THE INVENTION

Figure 1:
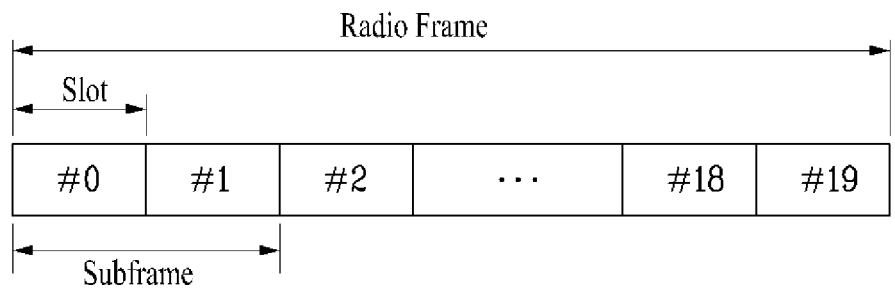
FIG. 1 illustrates a frame structure of a Long Term Evolution (LTE) system.

Reference will now be made in detail to the preferred embodiments of the present invention, examples of which are illustrated in the accompanying drawings. Wherever possible, the same reference numbers will be used throughout the drawings to refer to the same or like parts.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, the present invention will be described in detail as follows based upon an assumption that the mobile communication system used in the present invention corresponds to a 3GPP LTE system. However, with the exception for the unique features of the 3GPP LTE system, other mobile communication systems, such as the IEEE 802.16 system, may also be randomly applied in the present invention.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Furthermore, in the following description of the present invention, it is assumed that the user terminal (or user equipment) universally refers to a mobile or fixed user-end device, such as a User Equipment (UE), a Mobile Station (MS), an Advanced Mobile Station (AMS), and so on. Additionally, it is also assumed that the base station universally refers to as an arbitrary node of a network end, which communicates with the user equipment, such as a Node B (NB), an eNode B (eNB), a Base Station (BS), an Advanced Base Station (ABS), and so on.

First of all, the structures of a downlink subframe and an uplink subframe will hereinafter be described in detail with reference to FIG. 2 and FIG. 3.

Figure 2:
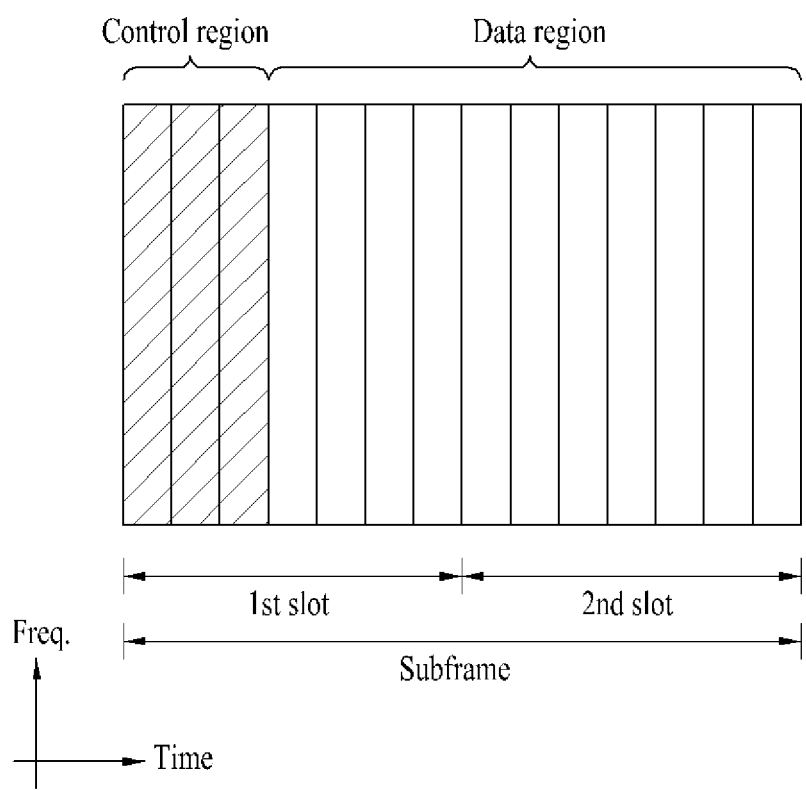
FIG. 2 illustrates a downlink subframe structure.

FIG. 2 illustrates the structure of a downlink subframe.

A downlink subframe includes 2 slots in a time domain. And, when using a normal cyclic prefix (CP), each slot includes 7 OFDM symbols. A maximum of 3 OFDM symbols (a maximum of 4 OFDM symbols for a bandwidth of 1.4 MHz) located at the front portion of a first slot within one sub-frame corresponds to a control region to which control channels are allocated (or assigned). The remaining OFDM symbols correspond to a data region to which a Physical Downlink Shared Channel (PDSCH) is assigned.

A Physical Downlink Control Channel (PDCCH) may include information on resource allocation and transmission format of a downlink shared channel (DL-SCH), information on resource allocation of an uplink shared channel (UL-SCH), paging information of a paging channel (PCH), system information of the DL-SCH, resource allocation of an upper layer (or higher level) control message, such as a Random Access Response, that is being transmitted over the PDSCH, a set (or group) of transmission power control commands on individual user equipments within the random user equipment group, transmission power control information, and so on. A plurality of PDCCHs may be transmitted within the control region. And, the user equipment may monitor the plurality of PDCCHs. Herein, the PDCCH may be transmitted as a group of at least one or more consecutive Control Channel Elements (CCEs). A CCE corresponds to a logical allocation unit used for providing a PDCCH at a coding rate based on a wireless channel state. Herein, the CCE corresponds to a plurality of resource element groups. The number of formats and available data bits of a PDCCH may be decided based upon a correlation between the number of CCEs and the coding rate provided by the CCEs.

The base station decides a PDCCH format in accordance with the DCI being transmitted to the user equipment and adds a Cyclic Redundancy Check (CRC) to the control information. Depending upon the owner or purpose of the PDCCH, the CRC may be masked with a Radio Network Temporary Identifier (RNTI). If the PDCCH belongs to a particular (or specific) user equipment, e.g., a cell-RNTI (C-RNTI) identifier of the user equipment, may be masked to the CRC. Alternatively, if the PDCCH belongs to a paging message, e.g., a Paging Indicator Identifier (P-RNTI), may be masked to the CRC. If the PDCCH belongs to a system information (more specifically, a system information block (SIB)), a system information identifier and a system information RNTI (SI-RNTI) may be masked to the CRC. In order to direct the random access response, which corresponds to a response to the transmission of a random access preamble of the user equipment, a random access RNTI (RA-RNTI) may be masked to the CRC.

Figure 3:
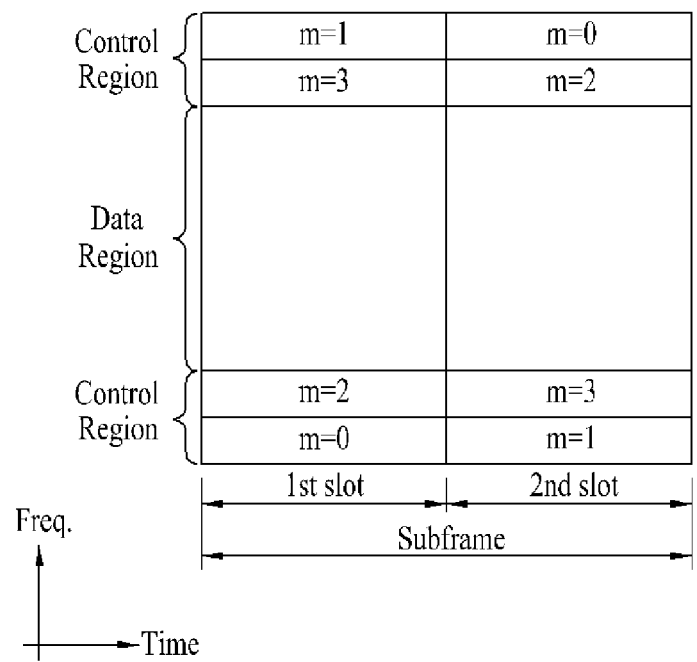
FIG. 3 illustrates an uplink subframe structure.

FIG. 3 illustrates the structure of an uplink subframe.

In a frequency domain, an uplink sub-frame may be divided into a control region and a data region. A Physical Uplink Control Channel (PUCCH) for transmitting uplink control information is allocated to the control region. And, a Physical uplink shared channel (PUSCH) for transmitting data is allocated to the data region. In a 3GPP LTE Rel-8/9 system, in order to maintain the characteristic of a unique (or single) carrier, a user equipment does not transmit the PUCCH and the PUSCH at the same time.

The PUSCH is mapped to an Uplink Shared Channel (UL-SCH), which corresponds to a transport channel. The uplink data that are being transmitted over the PUSCH may correspond to a transport block, which is a data block for the UL-SCH that is transmitted during a TTI. The transport block may correspond to user information. Alternatively, the uplink data may correspond to multiplexed data. The multiplexed data may correspond to control information being multiplexed with the transport block for the UL-SCH. For example, the control information multiplexed to the data may correspond to a Channel Quality Indicator (CQI), a Precoding Matrix Indicator (PMI), an HARQ, a Rank Indicator (RI), and so on. Furthermore, the uplink data may be configured only of the control information.

Hereinafter, the PUCCH will now be described in detail.

The PUCCH for one user equipment is assigned (or allocated) to a resource block pair (RB pair) within a subframe. Each of the resource blocks belonging to the resource block pair occupies a different subcarrier in each of the first slot and the second slot. The frequency occupied by each resource block belonging to the resource block pair, which is assigned to the PUCCH, is varied based upon a slot boundary. This is also referred to as the RB pair, which is assigned to the PUCCH, as being frequency-hopped at the slot boundary. By having the uplink control signal transmitted through different subcarriers in accordance with the time, the user equipment may acquire frequency diversity gain. Herein, m represents a position index indicating the logical frequency domain position of a resource block, which is assigned to the PUCCH within the subframe.

Depending upon the format of the PUCCH, the PUCCH delivers (or carries) various types of control information. PUCCH Format 1 delivers a Scheduling Request (SR). At this point, an On-Off Keying (OOK) method may be applied. PUCCH Format 1a delivers an Acknowledgement/Non-Acknowledgement (ACK/NACK), which is modulated by using a Bit Phase Shift Keying (BPSK) scheme with respect to one codeword. PUCCH Format 1b delivers an Acknowledgement/Non-Acknowledgement (ACK/NACK), which is modulated by using a Quadrature Phase Shift Keying (QPSK) scheme with respect to two codewords. PUCCH Format 2 delivers a Channel Quality Indicator (CQI), which is modulated by using the QPSK scheme. And, PUCCH Formats 2a and 2b deliver the CQI and the ACK/NACK.

Table 1 below shows a modulation scheme respective to a PUCCH format and a number of bits within a subframe.

TABLE 1

| PUCCH format | Modulation scheme | Number of bits per subframe, Mbit |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Hereinafter, a method for transmitting and receiving uplink control information in a wireless communication system according to the embodiment of the present invention will now be described in detail.

The embodiment of the present invention proposes a method for using one PUCCH format and resource for multiple user equipments or for additional information. Herein, a method for differentiating multiple user equipments or multiple types of information and a method for multiplexing ACK/NACK and SR will now be described in detail.

According to the embodiment of the present invention, the PUCCH formats may be modified so that the PUCCH formats can be used by multiple user equipments. Alternatively, the PUCCH formats may be used for a single user equipment, as described in the related art method. However, in this case, the PUCCH formats may be modified so as to be capable of transmitting (or transporting) additional information. As an example of such modification method, a constellation associated with the modulation process may be classified and used accordingly.

Figure 4:
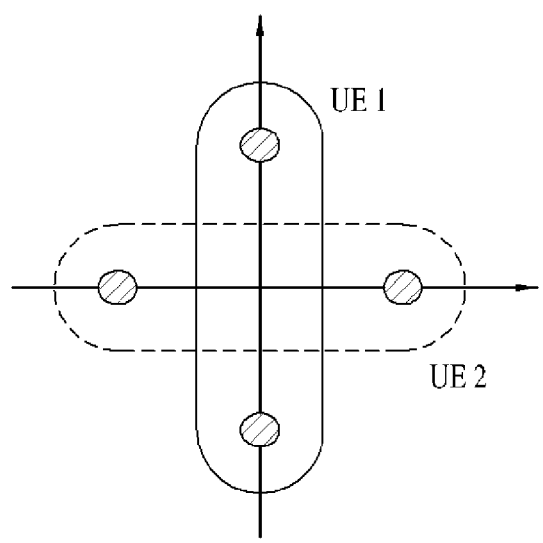
FIG. 4 illustrates a case where two user equipments are multiplexed.

FIG. 4 illustrates a case where two user equipments are multiplexed.

By using the classification of the constellation, FIG. 4 shows a case where 2 different users (or user equipments) use a single PUCCH format. More specifically, the first user equipment may use a BPSK modulation (e.g., +1, −1), and the second user equipment may use a constellation (e.g., +j, −j), which is processed with a phase rotation by 90 degrees. A signal received by the base station corresponds to a QPSK mode constellation. Herein, the signals received from two different user equipments may be detected and demodulated while maintaining the orthogonality between one another.

The method of FIG. 4 may have been designed to enable two user equipments to use PUCCH Format 1a while using phase rotation. Alternatively, the method of FIG. 4 may have been designed to enable two user equipments to divide and share PUCCH Format 1b.

Figure 5:
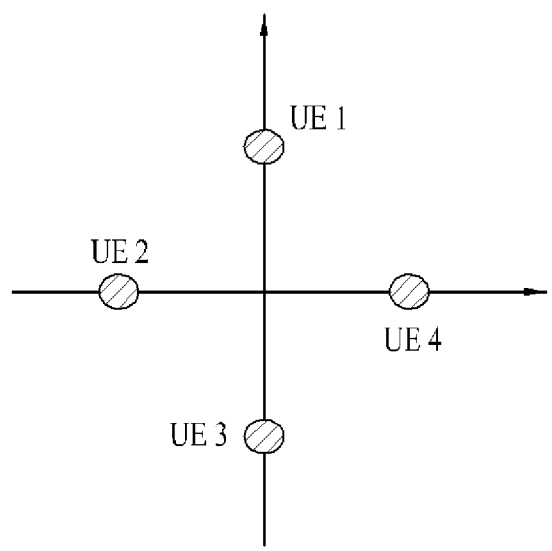
FIG. 5 illustrates a case where four user equipments are multiplexed.

FIG. 5 illustrates a case where four user equipments are multiplexed.

By using the classification of the constellation, FIG. 5 shows a case where 4 different users (or user equipments) use a single PUCCH format. More specifically, each of the four user equipments may either transmit or not transmit the corresponding information by using a respective constellation (e.g., +1, −1, +j, −j). In other words, the base station may compare the detected value with a specific threshold value. Then, if the detected value is greater than the specific threshold value, the base station determines that the user equipment has transmitted the information. And, if the detected value is smaller than the specific threshold value, the base station determines that the user equipment has not transmitted the information. Herein, the signals received from four different user equipments may be detected and demodulated while maintaining the orthogonality between one another.

The method of FIG. 5 may have been designed to enable two user equipments to use PUCCH Format 1 while using phase rotation and/or amplitude modification. Alternatively, the method of FIG. 5 may have been designed to enable four user equipments to divide and share PUCCH Format 1b.

By applying the above-described method, a larger number of user equipments may be capable of using a single PUCCH format by using the constellation method, which corresponds to a modulation method of a higher order.

A PUCCH format may either be assigned (or allocated) and used as a PUCCH format dedicated to a specific plurality of user equipments, or be assigned and used in a random access format, wherein a plurality of opportunities are configured instead of assigning a dedicated format to a specific plurality of user equipments, and wherein a specific user equipment selects and transmit one of the plurality of opportunities.

In the above-described method, one PUCCH format is used for a plurality of user equipments. However, by applying the above-described method, one PUCCH format may beused by diverse information of a single user equipment. Furthermore, one PUCCH format may be used by diverse information of a plurality of user equipments.

In order to apply the above-described method, a basic modulation of the PUCCH format or a constellation modification is required to be made. Therefore, it is difficult to identify multiple user equipments or diverse information using the same resource by using only the already-existing resource index. Accordingly, additional signaling information is required in order to perform such user equipment identification or information identification. As information associated with the constellation, such signaling information may correspond to a value associated with the designation of a specific constellation or a value associated with a phase rotation of a constellation.

For example, when 2 user equipments are multiplexed by each using a BPSK format constellation, the additional signaling information may consist of information identifying whether a real region (e.g., +1, −1) associated with the constellation is being used, or whether an imaginary region (e.g., +j, −j) is being used. Alternatively, as a value associated with phase rotation, the additional signaling information may consist of information identifying whether a 0° (or) 45° phase rotiation (e.g., +1, −1 or +1+j, −1−j) is to be performed, or whether a 90° (or) 135° phase rotation (e.g., +j, −j or −1+j, 1−j) is to be performed. The additional signaling information may be configured of 1 bit. As an applied example of the embodiment of the present invention, SR of two user equipments may be multiplexed by using the above-described multiplexing method. As another applied example of the embodiment of the present invention, each 1-bit ACK/NACK of two user equipments may be multiplexed by using the above-described multiplexing method. As yet another applied example of the embodiment of the present invention, one SR and one 1-bit ACK/NACK may be multiplexed by using the above-described multiplexing method.

In another example, when 4 user equipments are multiplexed by each using a constellation respective to information on the presence or absence, the additional signaling information may consist of information on four sections (e.g., +1, −1, +j, −j) associated with the constellation. Alternatively, as a value associated with phase rotation, the additional signaling information may consist of information on phase rotation (e.g., 0°, 90°, 180°, 270°=+1,−1, +j, −j or 45°, 135°, 175°, 120°=+1+j, −1+j, −1−j, 1−j). The additional signaling information may be configured of 2 bits. As an applied example of the embodiment of the present invention, SR of four user equipments may be multiplexed by using the above-described multiplexing method.

In addition to the related art PUCCH indexing method, when the user equipment decides the resource that is to be used, the above-described method provides a description on the necessity of a signaling process on the resource that is actually being used within the PUCCH. Laternatively, the base station may also provide the user equipment with signaling information on the resource that is being implicitly used. For example, in case UE-specific information, such as the RNTI of the user equipment, exists, a resource may be decided based upon the information that is acquired by a random calculation of the corresponding information. An example of the random calculation may include a modulo 2 operation (or calculation) a modulo 4 operation (or calculation). In this case, although it is not required for the base station to separately transmit signaling information, limitations may occur when the base station performs resource scheduling.

When applying the present invention, the channel through which the additional signaling information is to be transmitted will not limit the scope of the present invention. For example, in addition to the parameters that are being transmitted through a PUCCH configuration (PUCCH-Config) information element (IE), a PUCCH configuration dedicated (PUCCH-ConfigDedicated) IE, and a scheduling request configuration (SchedulingRequestConfig) IE, which are defined in the related art method, additional signaling information configured of 1 bit or 2 bits may be added to the application of the above-described method. In case a message or IE for transmitting the additional signaling information is separately defined, the additional signaling information should be included in the defined message or IE in addition to the resource index.

Hereinafter, a method of multiplexing an ACK/NACK and an SR will now be described in detail with reference to FIG. 6.

The physical time and frequency PUCCH that are assigned to a specific user equipment for the ACK/NACK may be identical to or different from the physical time and frequency PUCCH that are assigned to a specific user for the SR. In any case, in order to perform a negative SR (i.e., when a scheduling request does not exist) at a point when the SR resource assigned to the user equipment becomes available, an ACK/NACK is transmitted to the assigned ACK/NACK resource. However, in order to perform a positive SR (i.e., when a scheduling request exists), the ACK/NACK is transmitted to the assigned SR PUCCH resource. More specifically, by performing modulation on the ACK/NACK, the modulated value is transmitted by using the assigned SR PUCCH resource. More specifically, the SR resource should be available even to the ACK/NACK transmission. Also, as required, the ACK/NACK may consist of 1 bit or may consist of 2 bits.

For example, when two user equipments are multiplexed by each using a BPSK type constellation so as to identify an SR (presence and absence) and a 1-bit ACK/NACK, only the 1-bit ACK/NACK may be transmitted, and the 2-bit ACK/NACK cannot be transmitted. Therefore, a method for transmitting the 2-bit ACK/NACK is required.

According to the embodiment of the present invention, in order to transmit the 2-bit ACK/NACK, a method of bundling the 2-bit ACK/NACK and transmitting the bundled ACK/NACK is proposed. More specifically, ACK is transmitted only when the responses to a 2-bit HARQ all correspond to the ACK, and in the other cases, the NACK is transmitted. Therefore, the 1-bit HARQ response and the 2-bit HARQ response may use the same transmission format.

Figure 6:
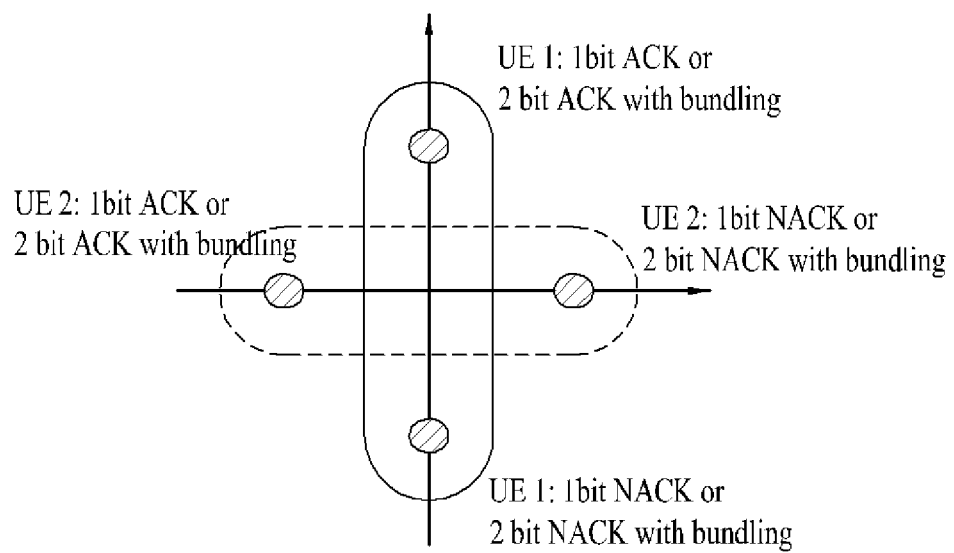
FIG. 6 illustrates a method for transmitting a 1-bit ACK/NACK signal and a method for transmitting a 2-bit ACK/NACK signal.

FIG. 6 illustrates a method for transmitting a 1-bit ACK/NACK signal and a method for transmitting a 2-bit ACK/NACK signal. Although the example of FIG. 6 shows only the ACK/NACK for simplicity, this is merely an example given to simplify the description of the present invnetion. Therefore, additional information such as SR may also be included herein. More specifically, in case of a positive SR, the example shown in FIG. 6 may be applied.

As another method for transmitting the 2-bit ACK/NACK, one 1-bit ACK/NACK of the 2-bit ACK/NACK is transmitted along with the SR, and the other 1-bit ACK/NACK is transmitted by using a resource, which is assigned for the ACK/NACK. In case a resource for the ACK/NACK is assigned to a specific user equipment along with a resource for the SR, the base station first detects the resource for the SR so as to demodulate the SR presence or absence and the 1-bit ACK/NACK. Then, only after the SR is detected, the resource for the ACK/NACK may be detected and demodulated with the remaining 1-bit ACK/NACK.

As yet another method for transmitting the 2-bit ACK/NACK, the multiplexing of the ACK/NACK may be prohibited in the SR resource adopting the present invention. More specifically, when the ACK/NACK resource and the SR resource are assigned at the same time, each user equipment generates a signal for the two resources and then adds the generated signals, which are then transmitted. In case the ACK/NACK and the SR are assigned at the same time for a specific user equipment, the base station detects the assigned SR resource so as to demodulate the SR presence or absence, thereby performing a decision on the SR. Thereafter, the base station detects the ACK/NACK resource, so as to be capable of demodulating the 1-bit or 2-bit ACK/NACK.

Alternatively, a method of expanding a symbol space of an ACK/NACK channel or an SR channel may be taken into consideration. For example, in order to expand the symbol space for the SR channel, a M-ary Amplitude modulation may be used, or a method of segmenting the slot boundary so as to expand the corresponding channel to two separate channel may be used. More specifically, when an X-bit ACK/NACK is to be transmitted, the symbol space may be expanded or maintained so that the symbol space of the SR can accommodate the X-bit.

Alternatively, the SR information may be moved to the ACK/NACK channel. More specifically, since the symbol space of the SR resource is insufficient, in case of PUCCH Format 1a, if the SR information is expanded to the QPSK, and if BPSK information is transmitted to a real axis, a phase rotation may be used so that the BPSK information can be transmitted to an imaginary axis so as to notify the SR information. In case the ACK/NACK is to be transmitted by using the PUCCH Format 1b, two different methods may be taken into consideration. One is to bundle the ACK/NACK information, so that a case where all corresponds to the ACK can be assigned to one state, and the remaining cases can be assigned to another state. Thus, the number of bits occupied by the ACK/NACK information can be reduced to 1 bit, thereby allowing a phase shift to be applied in order to transmit the SR information from the QPSK space, as described above. Alternatively, in case it is difficult to bundle the ACK/NACK information, a method of expanding the QPSK to 8PSK and including the SR information in the corresponding 1-bit space may also be considered. Furthermore, as described above, when it is assumed that information is transmitted in slot units, SR information may also be transmitted by using a differential modulation between slots. For example, when an SR does not exist, information is transmitted along with the initial PUCCH Format 1b. And, in case the SR exists, the second slot is phase-shifted with respect to the first slot, so as to transmit the signal. At this point, an opposite configuration may be applied mapping the SR.

FIG. 7 illustrates a structure of a mobile terminal and a base station according to other embodiments of the present invention.

A mobile terminal (or user equipment) (AMS) and base station (ABS) each includes an antenna 500 and 510, which is configured to transmit and receive information, data, signals, and/or messages, a transmission module (Tx module) 540 and 550, which is configured to control the antenna so as to transmit messages, a reception module (Rx module) 560 and 570, which is configured to control the antenna so as to receive messages, a memory 580 and 590, which is configured to store information associated with the communication to and from the base station, and a processor 520 and 530, which is configured to control the transmission module, and the reception module, and the memory. Herein, the base station may correspond to a Femto base station or a Macro base station.

The antenna 500 and 510 performs the function of transmitting signals generated from the transmission module 540 and 550 to the outside, or performs the function of receiving radio signals from the outside and delivering the received radio signals to the reception module 560 and 570. In case the multiple antenna (MIMO) function is supported, 2 or more antennae may be provided.

The processor 520 and 530 generally controls the overall operations of the mobile terminal or the base station. Most particularly, the processor 520 and 530 may perform a control function for performing the above-described embodiments of the present invention, a Medium Access Control (MAC) frame variable control function respective to the service characteristics and propagation environment (or condition), a hand over function, authentication and encryption functions, and so on. Also, the processor 520 and 530 may further include an encryption module, which is configured to control the encryption of various messages, and a timer module, which is configured to control the reception and transmission of various messages.

The processor 520 of the base station allocates (or assigns) resources for transmitting uplink control information. Herein, the resources for transmitting uplink control information are multiplexed so that multiple user equipments or diverse information can use a single PUCCH format by using constellations.

The transmission module 540 and 550 performs predetermined coding and modulations processes on signals and/or data that are to be scheduled and transmitted to the outside. Thereafter, the transmission module 540 and 550 may deliver (or transport) the processed signals and/or data to the antenna 500 and 510.

The transmission module 540 of the base station transmits resource allocation information of the resource, which is configured to transmit the uplink control information, and the transmission module 550 of the user equipment transmits uplink control information to the base station through the resource.

The reception module 560 and 570 performs decoding and demodulation processes on radio signals that are received from the outside through the antenna 500 and 510. Then, the reception module 560 and 570 recovers the data back to the initial (or original) state, so as to deliver the recovered data to the processor 520 and 530.

The reception module 560 of the base station receives uplink control information from at least one user equipment through the resource, which is configured for transmitting the uplink control information, and the reception module 570 of the user equipment receives resource allocation information for transmitting the uplink control information from the base station.

The memory 580 and 590 may store a program, which is configured for the processing and control functions of the processor. And, the memory 580 and 590 may also perform the function of temporarily storing data that are being inputted and/or outputted. (Herein, in case of a mobile station, the data may correspond to an uplink grant (UL grant) assigned (or allocated) from the base station, system information, a station identifier (STID), a flow identifier (FID), an action time, region allocation information, frame offset information, and so on.)

Furthermore, the memory may include at least one type of storage medium, such as a flash memory type, a hard disk type, a multimedia card micro type, a card-type memory (e.g., SD or XD memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and so on.

As described above, the method and apparatus for transmitting and receiving uplink control information in a wireless communication system have the following advantages. By multiplexing a resource using a constellation method, so that a PUCCH format can be used by multiple user equipments or diverse information, the present invention may enhance resource efficiency and may also reduce latency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for receiving uplink control information from a base station in a wireless communication system, the method for receiving the uplink control information comprises:
   allocating resources for transmitting uplink control information;
   transmitting resource allocation information of the resources; and
   receiving uplink control information from at least one user equipment through the resources, and
   wherein the resources are multiplexed so that a single Physical Uplink Control Channel (PUCCH) format can be used by a plurality of user equipments, a plurality of information, or a plurality of random access opportunities by enabling the plurality of user equipments, the plurality of information, or the plurality of random access opportunities to use different constellations each other, and
   wherein the resource allocation information includes an index of the resource and information on a constellation.

2. The method of claim 1, wherein the information on the constellation corresponds to a designation of the constellation.

3. The method of claim 1, wherein the information on the constellation corresponds to a phase rotation value of the constellation.

4. The method of claim 1, wherein a scheduling request (SR) and an Acknowledgement/Non-Acknowledgement (ACK/NACK) respective to two user equipments are multiplexed and transmitted through the resources.

5. The method of claim 4, wherein, when the ACK/NACK is equal to or larger than 2 bits, the ACK/NACK is bundled and transmitted.

6. A method for transmitting uplink control information from a user equipment of a wireless communication system, the method for transmitting the uplink control information comprises:
   receiving resource allocation information of resources for transmitting uplink control information from a base station; and
   transmitting uplink control information to the base station through the resources,
   wherein the resources are multiplexed so that a single Physical Uplink Control Channel (PUCCH) format can be used by a plurality of user equipments, a plurality of information, or a plurality of random access opportunities by enabling a plurality of user equipments, a plurality of information, or a plurality of random access opportunities to use different constellations each other, and
   wherein the resource allocation information includes an index of the resource and information on a constellation.

7. The method of claim 6, wherein the information on the constellation corresponds to a designation of the constellation.

8. The method of claim 6, wherein the information on the constellation corresponds to a phase rotation value of the constellation.

9. The method of claim 6, wherein a scheduling request (SR) and an Acknowledgement/Non-Acknowledgement (ACK/NACK) respective to two user equipments are multiplexed and transmitted through the resources.

10. The method of claim 9, wherein, when the ACK/NACK is equal to or larger than 2 bits, the ACK/NACK is bundled and transmitted.

11. A base station in a wireless communication system, the base station comprises:
    a processor configured to allocate resources for transmitting uplink control information;
    a transmission module configured to transmit resource allocation information of the resources; and
    a reception module configured to receive uplink control information from at least one user equipment through the resources, and
    wherein, the resources are multiplexed so that a single Physical Uplink Control Channel (PUCCH) format can be used by a plurality of user equipments, a plurality of information, or a plurality of random access opportunities by enabling a plurality of user equipments, a plurality of information, or a plurality of random access opportunities to use different constellations each other, and
    wherein the resource allocation information includes an index of the resource and information on a constellation.

12. The base station claim 11, wherein the information on the constellation corresponds to a designation of the constellation.

13. The base station of claim 11, wherein the information on the constellation corresponds to a phase rotation value of the constellation.

14. A user equipment of a wireless communication system, the user equipment comprises:
    a reception module configured to receive resource allocation information of resources for transmitting uplink control information from a base station; and
    a transmission module configured to transmit uplink control information to the base station through the resources,
    wherein the resources are multiplexed so that a single Physical Uplink Control Channel (PUCCH) format can be used by a plurality of user equipments, a plurality of information, or a plurality of random access opportunities by enabling a plurality of user equipments, a plurality of information, or a plurality of random access opportunities to use different constellations each other, and
    wherein the resource allocation information includes an index of resource and information on a constellation.

15. The user equipment of claim 14, wherein the information on the constellation corresponds to a designation of the constellation.

16. The user equipment of claim 14, wherein the information on the constellation corresponds to a phase rotation value of the constellation.

* * * * *